AUTOMATIC GAIN CONTROL FOR SIGNAL HAVING PLURAL DISCRETE LEVELS

Filed July 23, 1965 2 Sheets-Sheet 1

INVENTOR
DALE L. CRITCHLOW

Maurice H. Klitzman
ATTORNEY

Feb. 27, 1968 D. L. CRITCHLOW 3,371,317

AUTOMATIC GAIN CONTROL FOR SIGNAL HAVING PLURAL DISCRETE LEVELS

Filed July 23, 1965 2 Sheets-Sheet 2

United States Patent Office 3,371,317
Patented Feb. 27, 1968

3,371,317
AUTOMATIC GAIN CONTROL FOR SIGNAL HAVING PLURAL DISCRETE LEVELS

Dale L. Critchlow, Lincolndale, N.Y., assignor to International Business Machines Corporation, Armonk, N.Y., a corporation of New York Filed July 23, 1965, Ser. No. 474,384
8 Claims. (Cl. 340—172)

The present invention relates to automatic gain or responsivity control apparatus for a data transmission system wherein each signal element may take one of a fixed number of discrete values or states, each of said states being represented at the receiving end by a variable, or combination of variables, such as voltage and phase.

In the prior art data transmission systems, automatic gain control was generally achieved by comparing some feature of the received signal with a local reference signal, and using the difference between these signals to adjust the gain of the receiver. For example, in transmission systems using amplitude modulation of a carrier wave, the average level of the received signal over several modulation periods is compared with a local reference voltage, and the difference between the average value and the reference voltage is used to adjust the gain of the receiver. However, this type of automatic gain control is data sensitive because, for example, a long sequence of high amplitude data signals will cause the average value to rise to a high level, thus incorrectly causing the gain of the receiver to be reduced.

Another type of automatic gain control is used in television systems wherein the received signal contains special automatic gain control information at predetermined instants. The received signal is periodically sampled at these predetermined instants, and the samples are compared to a local reference voltage, and the resulting error voltage is used to adjust the gain of the receiver. However, this type of automatic gain control requires precise synchronization in order that only the correct predetermined instants are sampled for purposes of automatic gain control. If adjacent instants are sampled, gain control is lost.

Other automatic gain control schemes involve adding a pilot tone to the data signal. The frequency of the pilot tone is such that it can be readily separated from the data signal and compared with a local reference signal for purposes of automatic gain control. However, this type of automatic gain control is found to be inadequate when the transmission line characteristics are frequency dependent.

It is therefore an object of this invention to provide automatic gain control apparatus which operates on the data signal alone and does not require a pilot tone.

Another object of this invention is to provide automatic gain control apparatus which is free of synchronization problems.

A further object of this invention is to provide automatic gain control apparatus which is not data sensitive.

Still another object of this invention is to provide automatic gain control apparatus which is particularly adapted for use in data transmission systems wherein each signal element may take one of a fixed number of discrete values or states.

In accordance with the above objects, one embodiment of the present invention comprises threshold means for comparing the received signal element with one or more threshold levels, logic means responsive to said threshold means for selecting the appropriate reference voltage from a plurality of possible reference voltages, means for comparing the received signal elements with the selected reference voltages so as to produce error pulses whose polarity and magnitude depend upon the difference between the selected reference voltages and the received signal elements, and means responsive to said error pulses for adjusting the gain of the input circuit of the receiver.

In another embodiment, the gain of the input circuit of the receiver is fixed, but the above-mentioned threshold levels are variable in response to the error pulses.

Other objects and advantages of the invention will be pointed out in the following description and claims and illustrated in the accompanying drawings, which disclose, by way of example, the principle of the invention and the best mode, which has been contemplated, of applying that principle.

Figure 1:
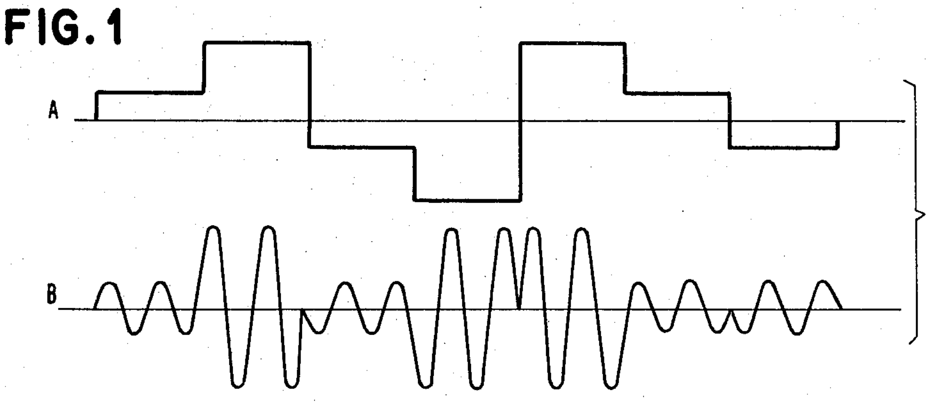
FIG. 1 shows a modulating signal and a modulated carrier waveform of the type received by a data receiver using the present invention.

In the preferred form of the subject data transmission system, each signal element may take one of four distinct values, corresponding, for example, to the following four bit groups, 00, 01, 10, and 11. However it should be understood that the following description equally applies to other coding plans, such as decimal coding for example. In FIG. 1, waveform A is the modulating signal waveform; each signal element is represented by a voltage which may take any one of the following four values:

+3 volts, —3 volts, +1 volt, —1 volt

This signal modulates a carrier. The resulting signal is represented by waveform B, whose amplitude corresponds to the amplitude of the modulating signal and whose phase corresponds to the sign of the modulating signal.

Figure 2:
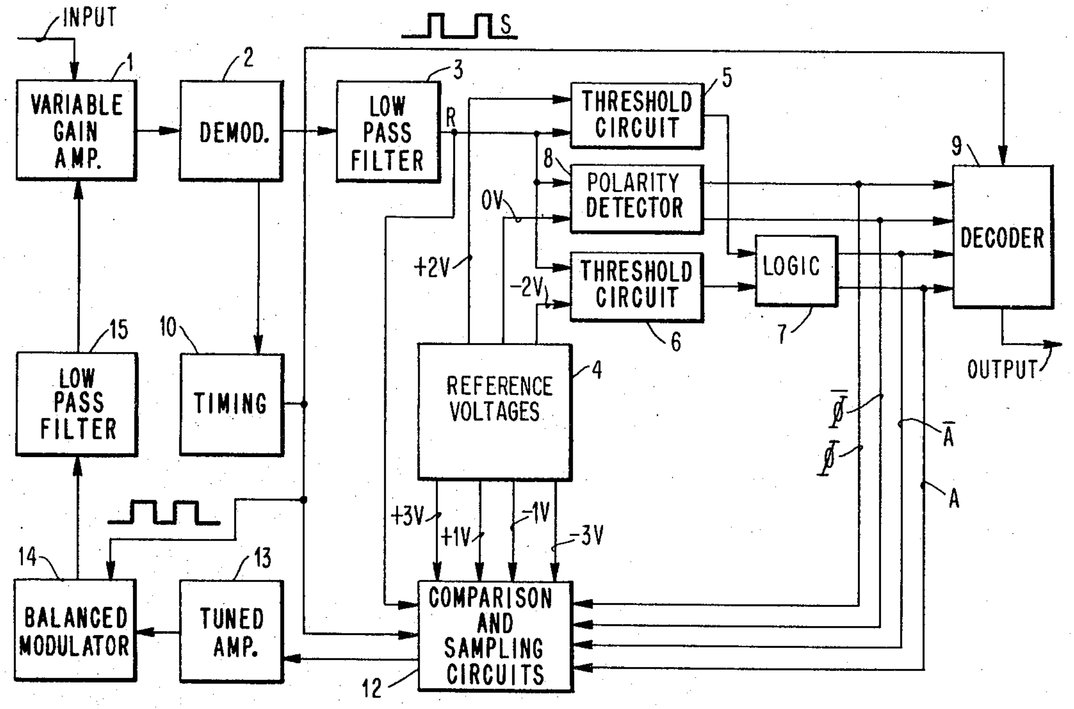
FIG. 2 shows a block diagram of a receiver in accordance with the present invention.

FIG. 2 shows a receiver including the automatic gain control apparatus of the subject invention. Modulated carrier wave signals corresponding to waveform B of FIG. 1 are applied to the input of variable gain circuit 1. The output of variable gain circuit 1 is processed through demodulating circuit 2 and low pass circuit 3. The output from low pass filter 3 resembles a signal of the type shown in waveform A of FIG. 1 except that it is bandlimited (i.e., the corners are rounded off). This signal is applied to threshold circuits 5 and 6 which together with logic circuit 7 serve to indicate whether the absolute value of each signal element is large or small. Logic circuit 7 indicates a large absolute value when the received signal R is more positive than both threshold levels and a small absolute value when the received signal R is more negative than both threshold levels. This function can be accomplished by the combination of an exclusive OR gate and an inverter.

The decision levels of threshold circuits 5 and 6 are determined by reference voltage source 4. For example, if the absolute value of each signal element may be either 3 volts or 1 volt under ideal conditions, the decision levels of threshold circuits 5 and 6 might be set at +2 volts and —2 volts respectively, so that each signal element having an absolute value larger than 2 volts would be properly recognized as a 3 volt signal while each signal element having an absolute value less than 2 volts would be properly recognized as a 1 volt signal.

The output data signal from low pass filter 3 is also fed into polarity detector 8 which compares the received data signal R with a reference signal so as to determine whether the received data signal is of positive or negative polarity. Polarity detector 8 may be simply a threshold device having its decision level set at 0 volt.

Decoder 9 contains logic circuits responsive to amplitude information from logic circuit 7, polarity information from polarity detector 8, and timing information from timing circuit 10 for reconstituting the original data signals. All of the above-described elements of the receiver shown in FIG. 2 are individually well known and will not be detailed further.

In the receiver shown in FIG. 2, the automatic gain control apparatus of the subject invention basically comprises reference voltage source 4, comparison and sampling circuits 12, tuned amplifier 13 whose tuning period equals a signal element duration, and balanced modulator 14 for modulating the output of tuned amplifier 13 in accordance with a timing signal delivered by timing circuit 10, and low pass filter 15.

Comparison and sampling circuits 12 receive amplitude information from logic circuit 7, and polarity information from polarity detector circuit 8. More particularly, a signal on line A indicates that the received signal exceeds 2 volts in absolute value and a signal on line A shows that the received signal is less than 2 volts. A signal on line $\phi$ indicates that the output from low pass filter 3 is of positive polarity, and a signal on line $\overline{\phi}$ indicates negative polarity. Comparison and sampling circuits 12 compare the received signal R from low pass filter 3 with one of the following reference voltages from circuit 4.

+3 v. if received signals are A and $\phi$
+1 v. if received signals are $\overline{A}$ and $\phi$
—3 v. if received signals are A and $\overline{\phi}$
—1 v. if received signals are $\overline{A}$ and $\overline{\phi}$ The comparison is performed at predetermined instants under the control of sampling signals from timing circuits 10. The resulting comparison will yield a positive pulse train if the gain of amplifier 1 is too high, and a negative pulse train if the gain is too low. The amplitude of these error pulses is directly proportional to the deviation of the gain from its normal value. The frequency of occurrence of the error pulses is equal to the signal transmission rate.

These pulses are applied to tuned amplifier 13 which is tuned to this frequency. The amplitude of the output oscillations from tuned amplifier 13 vary with the amplitude of the fundamental component of the input signal delivered by comparison and sampling circuits 12, which is to say that the amplitude of the output from tuned amplifier 13 varies approximately with the input signal pulse amplitude. The phase of the output oscillation may take either of two opposite values according to whether the pulses are positive or negative. These oscillations are fed into balanced modulator 14 together with a square wave signal of the same frequency delivered by timing circuits 10. The period of the square wave timing signal equals the duration of one element of the incoming data signal to the receiver and the phase of the timing square wave is such that its axis crossings coincide with the axis crossings of the oscillations from the output of tuned amplifier 13. The result of the modulation amounts to a rectification of the output from tuned amplifier 13 in a direction which depends on its phase relative to the timing signal. The rectified oscillations are filtered through low pass filter 15 which produces an output error voltage which is used to vary the gain of input circuit 1.

Figure 3:
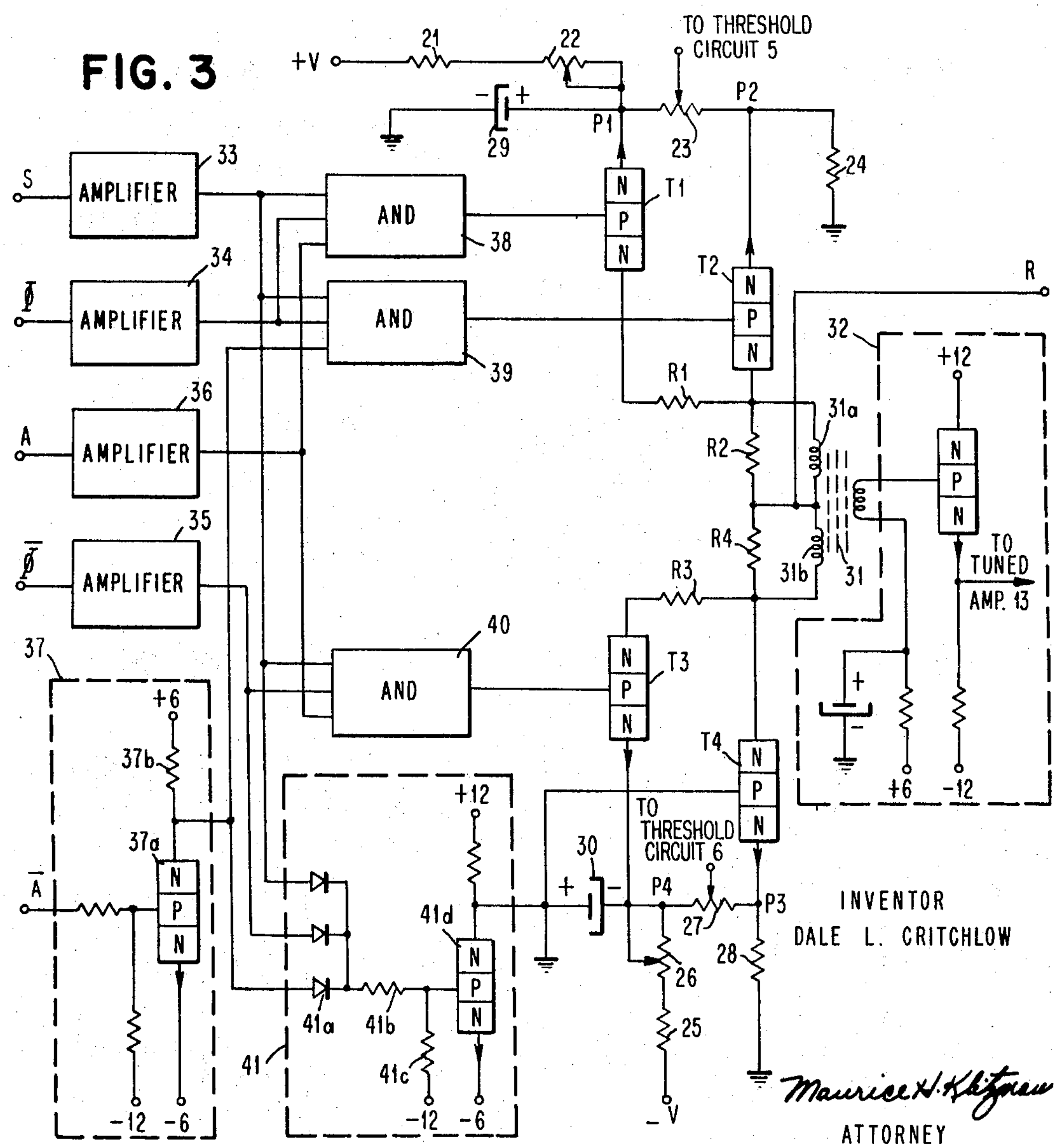
FIG. 3 shows a detailed diagram of the error signal generator circuit.

Tuned amplifier 13, balanced modulator 14 and low pass filter 15 may be of a known type, and will not be described in detail. The equivalent circuit diagram of one form of reference voltage source 4 and comparison and sampling circuit 12 are shown in FIG. 3.

The reference voltages +3 v. and +1 v. are obtained through a +6 v. regulated source and a voltage divider comprising resistors 21, 22, 23, 24. The reference voltages —1 v. and —3 v. are obtained the same way through a —6 v. regulated source and resistors 25 thru 28. High capacitance condensers 29 and 30 ensure voltage stability. Nodes P1, P2, P3, P4 from which are collected the reference voltages are respectively coupled to the emitters of four transistors T1, T2, T3, T4. These transistors are of NPN type and are symmetrical for practical purposes. Bases B1, B2, B3, B4 of each of these transistors may be brought up, as will be explained subsequently, to potentials in the neighborhood of —6 volts or + 12 volts. In the first case, the transistor is cut off and in the second case it is saturated, so that its impedance is equivalent to a short circuit for all practical purposes, both its emitter and collector being at the same as potential.

Signal R which appears at the output of low pass filter 3 (cf. FIG. 1) is passed on to the center tap of the primary winding of transformer 31. The terminals **31*a* and 31*b* of the primary winding are directly coupled to the collectors of transistors T2 and T4, and via R1 and R3, to the collectors of transistors T1 and T3. Resistors R2 and R4 are connected between the center tap and the terminals 31*a* and 31*b* of the primary winding. The transformer secondary is coupled to the input of an emitter follower amplifier 32**.

Transistors T1 thru T4 are controlled by AND circuits 38–41 which combine the received polarity ($\phi$ or $\overline{\phi}$) and amplitude (A or $\overline{A}$) representative pulses with sampling pulses S delivered by timing circuits 10 so that only one transistor conducts during each timing pulse duration.

Pulses S, $\phi$, $\overline{\phi}$, A, $\overline{A}$ are amplified by amplifiers 33, 34, 35, 36, and 37 respectively. Amplifier 37 is the only one shown in detail in FIG. 3, the others being identical. Amplifier 37 basically comprises a transistor **37*a* which is normally cut off, and which conducts whenever pulse $\overline{A}$ is present. When conducting, the transistor collector voltage drops to —6 volts; when cut off, resistor 37*b*** of the collector circuit together with the logic circuits to which the collector is coupled act as a voltage divider.

Circuits 38, 39, 40, 41 perform the logical AND function for negative inputs. AND circuit 41 is the only one detailed in FIG. 3, the others being identical. AND circuit 41 combines $\overline{A}$, $\overline{\phi}$ and S. Whenever any one of said three pulses, for example $\overline{A}$, is off, transistor 37 cuts off and the current flowing through resistor **37*b*, diode 41*a*, and resistors 41*b* and 41*c* causes the base potential of transistor 41*d* to reach a level sufficient to turn on transistor 41*d*, causing the collector voltage of transistor 41*d* to remain in the neighborhood of —6 volts. If on the other hand, all three pulses $\overline{A}$, $\overline{\phi}$ and S are present, transistor 41*d* cuts off and its collector voltage rises and turns on transistor T4 whose collector voltage is brought up to the reference voltage —1 volt. Thus the voltage which appears across resistor R4** is equal to the difference between the voltage of the received signal R and the reference voltage sample (—1 volt in the above case).

If during the following time interval the received signal element corresponds to a normal potential of —3 v., then the A and $\overline{\phi}$ pulses appear at the inputs to comparison and sampling circuits 12. During the duration of sampling signal S, these pulses will cause transistor T3 to conduct, the transistor collector being thereby brought to —3 volts so that the difference between the level of the received signal R and the —3 volts reference voltage will appear across the combination of resistors R3 and R4 and half winding **31*b*. The values of resistors R3 and R4 are chosen so that, for a given error in the gain of input circuit 1, the error voltage pulses coupled across transformer 31 will be of the same magnitude regardless of whether the particular element of the received signal R is of large or small absolute value. More particularly, the preferred impedance of resistor R3 is twice the impedance of the parallel combination of resistor R4 and half winding 31*b*. Resistors R1 and R2** are similarly proportioned.

In the same way, pulses $\overline{A}$ and $\phi$ would cause transistor T2 to conduct during the duration of sampling pulse S. Similarly pulses A and $\phi$ would cause transistor T1 to conduct during the duration of sampling pulse S. In the first case, a pulse, whose amplitude equals the difference between the level of the received signal R and the reference level, will appear across R2. And in the second case, one-third of that difference, so that in both cases the amplitude of the obtained pulses is the same for a given error in gain.

The polarity of the obtained pulses depends upon whether the gain of variable gain amplifier 1 is too large or too small. In other words, the current flowing through the half primary winding between terminal 31*a* and the center top in the case of too large a positive received signal, will have the same direction as the current obtained in the half primary winding between terminal 31*b* and the center top for the case of too large a negative received signal. Each half winding is wound in such a way that the pulses obtained in the secondary of transformer 31 maintain the same polarity no matter what the polarity of the signal element, as long as the gain error with respect to its nominal value is of the same kind (i.e., either too large or too small).

In the above described device, the error pulse train obtained is used to produce, by means of tuned amplifier 13, balanced modulator 14 and low pass filter 15, an error voltage which is used to vary the gain of variable gain input circuit 1 so as to bring the received signals back to their normal values.

Figure 4:
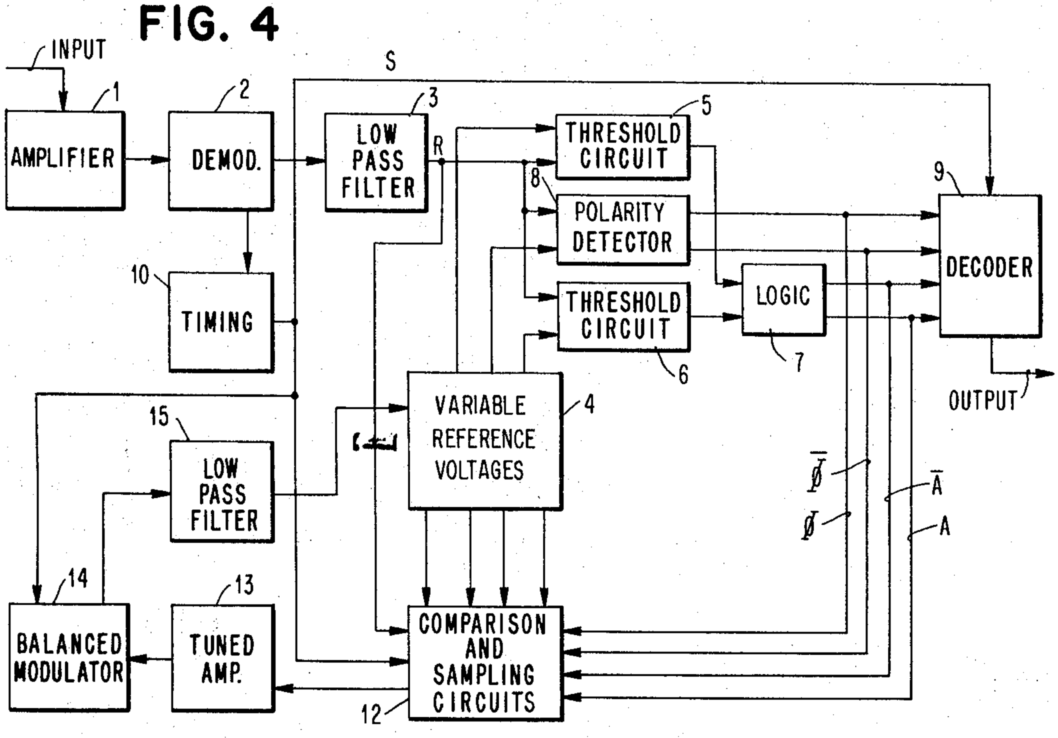
FIG. 4 shows a block diagram of an alternate receiver embodying the principles of the invention.

FIG. 4 shows an alternate embodiment of the invention. In FIG. 4 the gain of amplifier circuit 1 is fixed, but the voltages produced by variable reference voltage source 4 are adjustable in response to the error signal from low pass filter 15. In other words, the threshold levels of threshold devices 5 and 6 are adjusted so as to follow the variations in the gain of the transmission channel so that proper decoding of the transmitted data is achieved despite such variations. This mode of operation differs from the operation of the receiver shown in FIG. 2 wherein the gain of input amplifier 1 is adjusted so as to compensate for variations in the gain of the transmission channel. Other than input amplifier 1 and variable reference voltage source 4, the elements of the receiver shown in FIG. 4 are the equivalent of the corresponding elements shown in FIG. 2.

In order to better understand the operation of the receiver shown in FIG. 4, let us assume that the gain of the transmission channel drops 10% from its normal value. Under those circumstances the normal +3 volts output from low pass filter 3 would be reduced to +2.7 volts. Threshold circuits 5 and 6 and polarity detector 8 would recognize +2.7 volts as a high positive signal, and, therefore, pulses would appear at the inputs to amplifiers 34 and 36 of FIG. 3 causing AND gate 38 to turn on transistor T1. Assuming that P1 is at its normal potential of +3 volts, a voltage drop 0.3 volt appears across the combination of resistors R1 and R2 and half winding 31*a*. The resulting pulse of current which flows through half winding 31*a* is coupled through transformer 31 and circuit 32 to tuned amplifier 13 balanced modulator 14 and low pass filter 15 of FIG. 4. The output error voltage from low pass filter 15 is used to adjust the levels of voltage sources +V and −V of FIG. 3. In the present example, voltage source +V would be reduced 10% from its normal value of +6 volts to +5.4 volts. Similarly, voltage source −V would be raised 10% from its normal value of −6 volts to −5.4 volts.

The adjustment of voltage sources +V and −V would bring about corresponding 10% adjustments of the threshold levels of threshold circuits 5 and 6 and of the reference voltages at P1, P2, P3, and P4 as can be seen from an inspection of FIG. 3. In particular, the reference voltage at P1 would be reduced from +3 volts to +2.7 volts which is equal to the level of the high positive signal as it appears at the output of low pass filter 3. Hence it can be seen that the receiver is in balance until further variations occur in the gain of the transmission channel.

While the invention has been particularly shown and described with reference to a preferred embodiment thereof, it will be understood by those skilled in the art that the foregoing and other changes in form and details may be made without departing from the spirit and scope of the invention.

What I claim is:

1. In a receiver for multi-level, digital data signals, circuit means responsive to the received signal for indicating the discrete amplitude of the received signal during each time interval;
polarity detection means for determining the polarity of the received signal during each time interval; and
apparatus for adjusting the receiver to compensate for variations in the gain of the transmission channel, comprising:
means for generating a plurality of reference voltages, each reference voltage corresponding to one of the possible combinations of amplitude and polarity of the received signal;
means responsive to said threshold means and said polarity detection means for selecting one of said reference voltages during each time interval;
comparison means for comparing the selected reference voltage with the received signal during each time interval;
means responsive to said comparison means for producing an error signal corresponding to the difference between said selected reference voltage and said received digital data signal; and
means responsive to said error signal for adjusting said circuit means so as to reduce the difference between said selected reference voltage and said received signal.

2. In a receiver for multi-level, digital data signals, circuit means responsive to the received signal for indicating the discrete level of the received digital data signals during each time interval; and
apparatus for adjusting the receiver to compensate for variations in the gain of the transmission channel comprising:
means responsive to said circuit means for generating a reference voltage which corresponds to the nominal level of the received signal during each time interval;
means responsive to said received signal and said reference voltage for generating an error signal corresponding to the difference between said reference voltage and said received signal; and
means responsive to said error signal for adjusting said circuit means so as to reduce the difference between said reference voltage and said received signal.

3. In a receiver for multi-level digital data signals, a variable gain input circuit;
threshold means responsive to the output from said variable gain circuit for indicating the discrete amplitude assumed by the received signal during each time interval;
polarity detection means responsive to the output from said variable gain circuit for indicating the polarity of the received signal during each time interval; and
automatic gain control means comprising:
a plurality of reference voltage sources, each reference voltage corresponding to one of the possible combinations of amplitude and polarity of the received signal;
means responsive to said threshold means and said polarity detection means for selecting one of said reference voltage sources during each time interval;
comparison means for comparing said selected reference voltage to said received signal during each time interval;
means responsive to said comparison means for generating an error signal corresponding to the difference between said reference voltage and said received signal during each time interval; and means responsive to said error signal for adjusting the gain of said variable gain input circuit.

4. In a receiver for multi-level, digital data signals, threshold means responsive to the received signal for indicating the discrete level of the received digital data signals during each time interval;

polarity detection means for determining the polarity of the received signal during each time interval; and automatic gain control apparatus comprising:

means for generating a plurality of reference voltages;

means responsive to said threshold means and said polarity detection means for selecting one of said reference voltages during each time interval;

comparison means for comparing the selected reference voltage with the received digital data signal during each time interval;

means responsive to said comparison means for producing an error signal corresponding to the difference between said selected reference voltage and said received digital data signal during each time interval; and means responsive to said error signal for adjusting the gain of the receiver.

5. In a receiver for multi-level, digital data signals, threshold means responsive to the received signal for indicating the discrete level of the received signal during each time interval; and automatic gain control apparatus comprising:

means responsive to said threshold means for generating a reference voltage which corresponds to the nominal level of the received signal during each time interval;

means responsive to said received signal and said reference voltage means for generating an error signal corresponding to the difference between said reference voltage and said received signal; and means responsive to said error signal for adjusting the gain of the receiver.

6. In a receiver for multi-level digital data signals, threshold means responsive to the received signal for indicating the discrete amplitude of the received signal during each time interval;

polarity detection means responsive to the received signal for indicating the polarity of the received signal during each time interval; and automatic responsivity control means comprising:

a source of reference voltages, each reference voltage corresponding to one of the possible combinations of amplitude and polarity of the received signal;

means responsive to said threshold means and said polarity detection means for selecting the one of said reference voltages during each time interval;

comparison means for comparing said selected reference voltage with said received signal during each time interval;

means responsive to said comparison means for generating an error signal corresponding to the difference between said selected reference voltage and said received signal during each time interval; and means responsive to said error signal for adjusting the threshold levels of said threshold means.

7. In a receiver for multi-level digital data signals, threshold means responsive to the received signal for indicating the discrete level of the received signal during each time interval; and automatic responsivity control means comprising:

a source of reference voltages, each reference voltage corresponding to one of the discrete level of said received signal;

means responsive to said threshold means for selecting the one of said reference voltages which corresponds to the level of said received signal during each time interval;

comparison means for comparing said selected reference voltage with said received signal during each time interval;

means responsive to said comparison means for generating an error signal corresponding to the difference between said selected reference voltage and said received signal during each time interval; and means responsive to said error signal for adjusting the threshold levels of said threshold means.

8. In a receiver for multi-level digital data signals, threshold means responsive to the received signal for indicating the discrete level of the received signal during each time interval;

automatic responsivity control means comprising:

means responsive to said threshold means for generating a reference voltage which corresponds to the nominal level of said received signal during each time interval;

means responsive to said received signal and said reference voltage for generating an error signal corresponding to the difference between said reference voltage and said received signal during each time interval; and means responsive to said error signal for adjusting the threshold levels of said threshold means.

No References Cited.

JOHN W. CALDWELL, *Primary Examiner.*

H. I. PITTS, *Assistant Examiner.*